(12) United States Patent
Muscarella (10) Patent No.: US 8,185,906 B2
(45) Date of Patent: May 22, 2012

(54) METHOD AND APPARATUS FOR DYNAMICALLY ADJUSTING THREAD POOL

(75) Inventor: Fabrizio Muscarella, Mannheim (DE)

(73) Assignee: SAP AG, Walldorf (DE)

( * ) Notice: Subject to any disclaimer, the term of this patent is extended or adjusted under 35 U.S.C. 154(b) by 1112 days.

(21) Appl. No.: 11/752,848

(22) Filed: May 23, 2007

(65) Prior Publication Data

US 2008/0295107 A1  Nov. 27, 2008

(51) Int. Cl.
*G06F 9/46* (2006.01)
(52) U.S. Cl. ......................... 718/104; 718/102
(58) Field of Classification Search ................. None
See application file for complete search history.

(56) References Cited

U.S. PATENT DOCUMENTS

| | | | | |
|---|---|---|---|---|
| 5,902,352 A | * | 5/1999 | Chou et al. | 718/102 |
| 6,477,561 B1 | * | 11/2002 | Robsman | 718/105 |
| 7,437,446 B2 | * | 10/2008 | Bailey et al. | 709/223 |
| 7,681,087 B2 | * | 3/2010 | Simpson et al. | 714/47 |
| 7,774,784 B2 | * | 8/2010 | Fields et al. | 718/104 |
| 2002/0116505 A1 | * | 8/2002 | Higgins et al. | 709/227 |
| 2005/0080849 A1 | * | 4/2005 | Wee et al. | 709/204 |
| 2007/0112953 A1 | * | 5/2007 | Barnett | 709/224 |

OTHER PUBLICATIONS

Dongping Xu, Performance study and dyanamic optimization design for thread pool systems, 2004.*

* cited by examiner

*Primary Examiner* — Camquy Truong
(74) *Attorney, Agent, or Firm* — Blakely Sokoloff Taylor & Zafman LLP (57) ABSTRACT

Methods and apparatuses enable dynamic thread pool management. A system with a thread pool is monitored, and performance data gathered. The performance data can be combined with historical thread performance data to generate cumulative thread performance data. Based on the cumulative thread performance data, the number of threads in the thread pool can be dynamically adjusted. In one embodiment, the data is persisted in nonvolatile memory. In one embodiment, the dynamic thread pool management works in conjunction with dynamic and static system configurations.

18 Claims, 4 Drawing Sheets

METHOD AND APPARATUS FOR DYNAMICALLY ADJUSTING THREAD POOL

FIELD

Embodiments of the invention relate to multi-threading systems, and more particularly to dynamic thread pool management.

BACKGROUND

The use of multithreading is increasingly common in computing systems, especially in server environments. Multithreading allows for multiple tasks to be "active" on a computing platform simultaneously. The tasks can be any type of application, kernel, program, software module, etc., which may execute on a computing system. Multitasking can be truly simultaneous through the use of multiple processors and/or processing cores. Multitasking can result in execution of tasks in an apparently simultaneous manner to a user through the sharing or resource allocation of the computing resources in the computing system. In apparent or pseudo multitasking, the resources of the computing system are shared in a manner that it would generally appear to a user that multiple tasks are being executed simultaneously. The computing system generally switches very quickly (relative to a user's perceptions) between dedicating resources to the various tasks, and so appears to be executing each simultaneously.

Especially in server environments, multiple threads may be started or active. The group of active threads may be referred to as a thread pool. Traditional management of a thread pool has been limited to the static configuration settings in place in a system. That is, a system may be allowed to have a certain number (e.g., up to a configured maximum) of managed threads or threads that are open at a time in the system. The configuration is traditionally based on network configuration settings that have little or nothing to do with the actual hardware on which the threads are to be executed. Additionally, the management of the thread pool is traditionally inefficient due to the inefficient use of resources in a system. The thread management may attempt to allow more active threads than can be supported by the hardware. In a case where multiple systems are sharing the same hardware resources, multiple thread pools having the same settings and the same type management can result in significant inefficiencies. The inefficiencies result in increased delays and decreased network performance.

SUMMARY

Methods and apparatuses enable dynamic thread pool management. A system with a thread pool is monitored, and performance data gathered. The performance data can be combined with historical thread performance data to generate cumulative thread performance data. Based on the cumulative thread performance data, the number of threads in the thread pool can be dynamically adjusted. In one embodiment, the data is persisted in nonvolatile memory. In one embodiment, the dynamic thread pool management works in conjunction with dynamic and static system configurations.

In one embodiment, the dynamic thread pool management can be accomplished with a thread manager that collects performance data and performs statistical aggregation on the performance data. The thread pool can be dynamically adjusted according to any timing granularity of cumulative performance data that makes sense for the particular system. For example, performance data can be used to adjust the thread pool according to trends in hourly, daily, weekly, monthly, etc., performance.

BRIEF DESCRIPTION OF THE DRAWING

The following description includes discussion of a figure having illustrations given by way of example of implementations of embodiments of the invention. The drawing should be understood by way of example, and not by way of limitation.

DETAILED DESCRIPTION

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

Method and apparatuses enable adaptive thread management. The management of a thread pool is made to be dynamic, and based on system resource usage. An adaptive approach allows the thread management to match the thread usage to the available system resources, whether the hardware has one or more thread pool systems sharing the hardware. In one embodiment, no static configuration is applied, and configuration of the system is applied only through the dynamic management. However, static configuration settings can still be applied to a system, and the thread management will provide dynamic management within the static configurations. Thus, for example, assuming a system is configured to have a certain maximum number of threads, the thread management can manage the thread pool to have up to the maximum number of threads.

In one embodiment, the thread manager monitors and collects performance and activity information for every thread. The performance data can be correlated with time information. The thread performance data can be kept for a period of time to generate historical thread performance data. Newly collected thread performance data is combined with the historical thread performance to generate cumulative thread performance data, which indicates thread performance not just for currently executing threads, but also indicates thread performance trends. Combined with the time information, the thread performance trends over time can be monitored and predicted. Based on the thread performance data, the thread manager dynamically changes the number of running threads in the thread pool. Thus, the thread manager adapts the thread pool size according to thread performance data or statistical resource consumption data. Note that the thread pool size can be adapted, rather than just adjusting the number of threads within the pool that are active.

In one embodiment, threads are started on demand, or upon request, and added to the managed threads. In one embodiment, threads that are idle for a period of time are closed, which frees system resources. In one embodiment, threads can be closed or cut for inactivity in one of two ways: based on the thread achieving an idle period indicated in a static configuration, and based on an idle period indicated by cumulative thread performance data. That is, a static configuration may indicate that a thread should be closed if it has been inactive for a period of time. Also, historical data may indicate that if a thread has been inactive for a period of time, it is generally not needed in the system at that time. Thus, the thread manager can monitor the period of inactivity of a thread and determine whether to close the thread, based on either or both of a static configuration time, and historical performance data.

With an adaptive approach to the thread pool size and thread pool management, the number of threads in a system can be matched to the hardware. Matching the number of threads to the hardware resources of a system can reduce the risk of configuring a system to have a number of threads that is over or under what is actually supported by the hardware. Also, multiple systems each having thread pools can more effectively share hardware resources without conflict, based on applying statistical performance and hardware availability to the management. Thus, in a long term process that has multiple threads, a better use and distribution of the system resource results. System performance is improved, and the system can be more responsive to requests for processing or access.

As an example system, consider a web server that runs every session in a separate thread. Traditionally, a thread pool for the web server would be configured, which could fix values for an initial number of threads, a maximum number of threads, and a minimum number of threads. The management would be traditionally limited to using those fixed values, regardless of the actual system performance. In an adaptive approach, the actual usage of the web server could be monitored to determine how many threads need to be open, including watching performance trends over time. The thread pool can be adapted to expand during peak usage periods, and decrease in size during periods of minimal usage.

Figure 1:
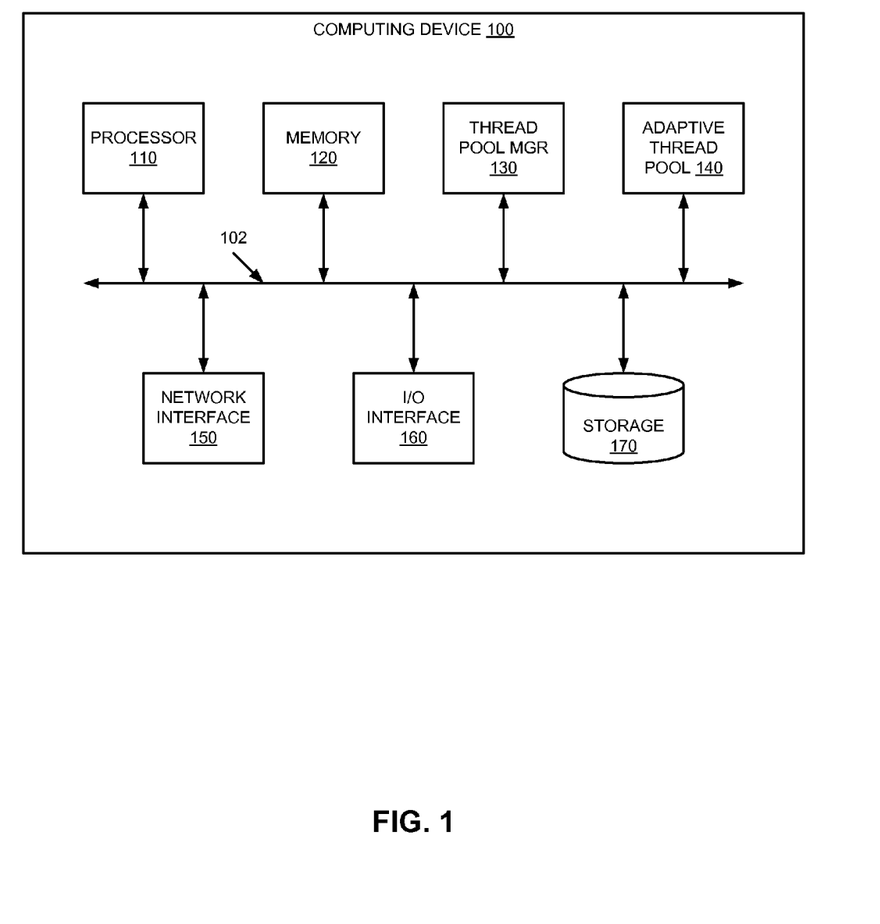
FIG. 1 is a block diagram of an embodiment of a system having a thread pool manager and an adaptive thread pool.

FIG. 1 is a block diagram of an embodiment of a system having a thread pool manager and an adaptive thread pool. Computing device 100 represents any of a number of hardware resources on which a thread pool and accompanying thread pool manager may be hosted. Note that the hardware resources could be some or all of the resources of a physical machine. Not all resources need to be located on the same physical device. Computing device 100 includes one or more processors 110, which controls the operation of computing device 100. Processor 110 may include any type of microprocessor, central processing unit (CPU), or programmable general-purpose or special-purpose microprocessors. Computing device 100 includes memory 120, which represents the main memory of computing device 100 to provide temporary storage for code or data to be executed by processor 110. Memory 120 may include read-only memory (ROM), flash memory, one or more varieties of random access memory (RAM, e.g., static RAM (SRAM), dynamic RAM (DRAM), synchronous DRAM (SDRAM), etc.), or a combination of memory technologies.

Computing device 100 includes adaptive thread pool 140 and thread pool manager 130 that manages thread pool 140. In one embodiment, thread pool manager 130 can be implemented as a software module executed on processor 110 out of memory 120. Hardware or special purpose integrated circuits or controllers could also be configured to implement thread pool manager 130. Thread pool 140 generally is considered to be included within memory 120, although an implementation on a separate standalone device is possible. In one embodiment, thread pool 140 is an object managing a list of started threads that can be executed by processor 110. Thread pool manager 130 can operate as a standalone component, or be a module within memory 120. Thread pool manager 130 can also be a sub-component of thread pool 140, which manages the threads. A key feature of thread pool 140 is that it is adaptive. The size of thread pool 140 can be dynamically adjusted based on performance data for computing device 100. Dynamic adjustment refers to adjustment of the size of thread pool 140 during run-time, or while thread pool 140 is operating.

The various elements of computing device 100 are coupled to bus system 102. Bus system 102 is an abstraction that represents any one or more separate physical buses, communication lines/interfaces, and/or multi-drop or point-to-point connections, connected by appropriate bridges, adapters, and/or controllers. Computing device 100 may also include one or more network interface(s) 150, one or more input/output (I/O) interface(s) 160, and one or more storage device (s) 170.

Network interface 150 enables computing device 100 to communicate with remote devices over a network, and may be, for example, an Ethernet adapter or other local area network (LAN) adapter. I/O interface 160 may include one or more interface components to connect computing device 100 with other electronic equipment, for example, custom connections, blade adapters, etc. Additionally, computing device 100 may accessible to a human user, and thus have video, audio, and/or alphanumeric interfaces through I/O interface 160. Storage 170 may be or include any conventional medium for storing data in a non-volatile manner. Storage 170 holds data and/or instructions in a persistent state (i.e., the value is retained despite interruption of power to computing device 100).

Figure 2:
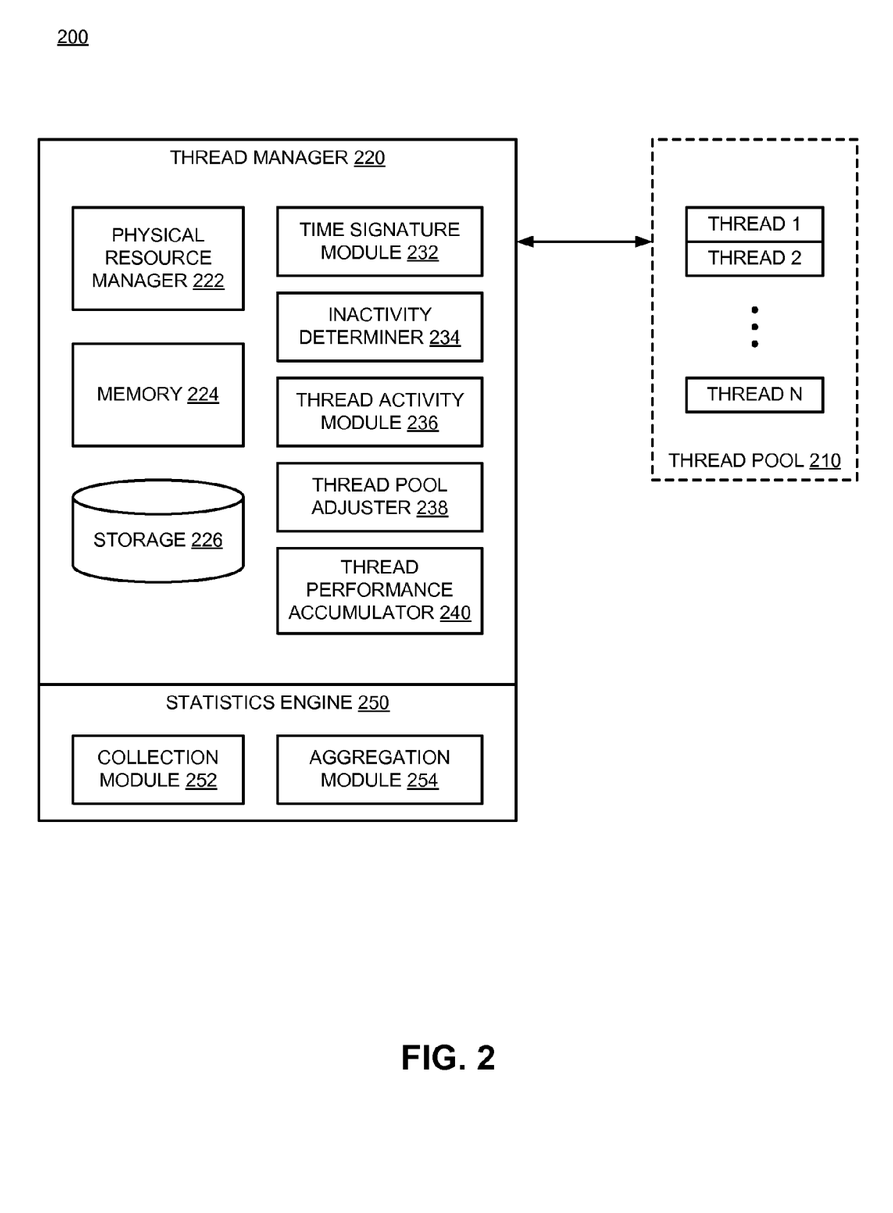
FIG. 2 is a block diagram of an embodiment of a system having a thread manager with a statistics engine.

FIG. 2 is a block diagram of an embodiment of a system having a thread manager with a statistics engine. System 200 represents an example thread manager 220, which may be a thread manager according to any embodiment described herein. Similarly, thread pool 210 may be an adaptive thread pool according to any embodiment described herein. Thread pool 210 provides a number of threads, thread 1 through thread N, which may be used to execute tasks in system 200. As described herein, in an adaptive thread pool, the number of potential threads can be dynamically changed, according to expectation (based on historical data), need, and/or system load. In one embodiment, each of threads 1 to N has any of three possible states: idle, running, or stopped. A running thread is a thread that currently has a task in some stage of execution. A stopped thread is a thread that finishes the processing required by its associated task(s). An idle thread is a thread that belongs to the pool, but currently has no active tasks. Thus, the thread is part of the thread pool that can be started at any time, without the need for allocating or provisioning the thread, because it already exists.

Thread manager 220 represents one or more components that provide management of thread pool 210. In one embodiment, thread manager 220 is a thread within thread pool 210. Alternatively, thread manager 220 could exist as a component in a separate memory or execution space, or could even be implemented from separate hardware, for example. Thread manager 220 includes various components depicted in FIG. 2, which could represent the actual components, or interfaces from an implementation of thread manger 200 to the components themselves. In one embodiment, thread manager 220 includes memory 224, which represents volatile storage for data. Thread manager 220 may also include storage 226, which represents nonvolatile storage for data. Thread manager 220 generates and/or accesses various data items that are stored, including physical resource information, historical thread performance data, etc. Storing data in (nonvolatile) storage 226 allows for the data to be persisted in the event of a power interruption, or a reset/restart.

In one embodiment, thread manager 220 includes physical resource manager 222 that enables thread manager 220 to determine what physical resources are available within system 200 for use by thread pool 210. Such information can be obtained from an operating system, a platform hardware component (e.g., a basic input/output system (BIOS)), etc. Physical resource manager 222 includes the necessary interfaces to obtain information about available system resources. The information can be stored in memory 224 and/or storage 226. Physical resource manager 222 can be considered a resource identifier that identifies the resources in the system. In one embodiment, physical resource manager 222 includes logic to determine configuration settings based on the physical resources identified. For example, physical resource manager 222 may configure a number of threads to initiate the thread pool, a maximum number of threads that can be part of the thread pool, etc.

Thread manager 220 may include any of a number of components or modules to enable thread manager 220 to perform functions related to management of thread pool 210. For example, thread manager 220 may include time signature module 232, inactivity determiner 234, thread activity module 236, thread pool adjuster 238, and thread performance accumulator 240. Certain implementations may include more or fewer components than those depicted. Also, in certain implementations, certain of the depicted components could be combined, while others could be separated in multiple components. Thus, thread manager 220 of FIG. 2 is intended to be illustrative, and not restrictive of a thread manager.

Time signature module 232 enables thread manager 220 to obtain timing information from threads of thread pool 210. For example, thread pool 210 may be configured to have each thread indicate when the thread starts and stops execution. One simple method is to have a function call or a method that allows the threads to signal the beginning or ending of processing. Time signature module 232 could then gather time signature information from system 200 to represent the time the indication was received. Such time information can be stored in memory 224 and/or storage 226 and possibly associated with the particular thread. Such information can inform an analysis about how long to expect a thread to execute, sit idle, etc.

Inactivity determiner 234 enables thread manager 220 to determine how long a particular thread of thread pool 210 has been inactive. If a thread is inactive for a threshold period of time, the thread may be closed. Inactivity determiner 234 may operate in conjunction with time signature module 232. In one embodiment, inactivity determiner 234 includes a thread state module that determines a state of the threads (e.g., running, idle, stopped). Inactivity determiner 234 may further determine whether a thread should be closed. The threshold inactivity level may be obtained from a static configuration, a dynamic configuration, historical data, or any combination of these.

Thread activity module 236 enables thread manager 220 to determine a level of activity of the threads within thread pool 210. In one embodiment, thread activity module 236 includes or is a thread state module that determines the state of threads. If thread activity module 236 determines that all threads are active, the thread pool size may be increased. Thread activity module 236 can provide information that is used in conjunction with historical performance data to determine how many threads to have in thread pool 210. In one embodiment, thread activity module 236 includes thread inactivity module 234, and can provide information regarding the activity or inactivity of threads in thread pool 210.

Thread pool adjuster 238 enables thread manager 220 to dynamically adjust the size of thread pool 210. The size of thread pool 210 refers to the number of available threads. If a thread exists, it will be either active or available. No more than a certain number of threads can be active, according to configuration parameters. However, not all available threads may be necessary, and can thus be closed and so removed from thread pool 210. Also, more threads than the number of threads active or available within thread pool 210 may be needed, and can be added to the pool, up to a configuration threshold number. In this way, resources associated with having a thread open and available can be conserved in system 200. Thread pool adjuster 238 can include thread closing and thread opening or provisioning methods/processes.

Thread performance accumulator 240 enables thread manager 220 to keep historical thread performance data. Thread performance accumulator 240 may place data in memory 224 and/or storage 226. In one embodiment, information is stored in an extensible markup language (XML) file. In another embodiment, information is stored in a JAVA object. In one embodiment, the information exists only in memory. Thus, thread manager 220 may exist (e.g., be instantiated) in memory, and the data exists and is used there. The data is the historical thread performance data. The historical thread performance can include information about how many threads are open, when, how many are active, how many are idle, how often requests for threads are received, how long threads sit idle before being requested, etc. Such information can be obtained and interpreted in conjunction with a statistics engine. Other information is possible. Note that information could be analyzed and inform the system about expected use patterns. The use can specify historical usage for days of the month or days of the week. Days of the year could also be used; however, such an analysis may require a burdensome amount of data. Granularity can be changed from one implementation to the next, and depends upon the application of the system. Even within an enterprise, different systems may use different granularity, depending on what makes sense for the implementation. In one embodiment, a three-month data store is maintained from which trends may be determined.

Note that the granularity of the system informs the system of trends to which it can respond. For example, in a particular system, hour-by-hour data can be kept. Thus, thread manager 220 could determine, based on historical performance data, how many threads to have active within a given hour. The historical performance data may be only a factor to consider, and may influence whether the system expects traffic to increase or decrease, and how many threads have historically been used. Based on such historical performance data and/or other historical performance data, thread manager 220 can determine that the size of thread pool 210 should be increased or decreased. Thread performance accumulator 240 either collects statistical and performance data, and/or works in conjunction with another entity that collects data (e.g., FIG. 2 includes statistics engine 250 that may collect data, as described in more detail below). In one embodiment, data is weighted differently, depending on how new the data is. For example, new data may be more heavily weighted than old data.

In one embodiment, system 200 includes statistics engine 250. In an implementation with statistics engine 250, the engine may be part of thread manager 220, part of thread performance accumulator 240, or separate from either entity. Statistics engine 250 works in conjunction with thread manager 220 to provide historical performance data for analysis to determine how many threads to include within thread pool 210. Statistics engine 250 may include sub-modules that provide functionality to statistics engine 250. For example, statistics engine 250 may include collection module 252 that collects statistical or performance data. In one embodiment, collecting the data refers to receiving indication messages from threads regarding when the start and stop executing. Thus, for example, the threads themselves can collect or generate data on their own performance, which is then sent to collection module 252 of statistics engine 250.

Thread manager 220 may keep or have access to a data table or other data store/cache that includes information regarding the threads of thread pool 210. In one embodiment, when a thread gets released, it updates data in the data table. Collection module 252 may then collect the information from the table. In one embodiment, statistics engine 250 is an object that collects the information placed in the data table. The threads may indicate to thread manager 220 when they start and stop, and then collection module 252 can pull the time when the indications are received. The data collection can be at random times, for example, when a thread starts or stops, or can be at scheduled times.

Statistics engine 250 may also include aggregation module 254, which provides aggregation functions for statistics engine 250. In one embodiment, statistics engine 250 has two states: a data collection state, and a data aggregation state. Data aggregation refers to the combining of data that is gathered. Aggregation may include weighting data (as described above with respect to thread performance accumulator 240). Note that thread performance accumulator 240 and aggregation module 254 may be the same component. Aggregation of the data could be more heavily weighted for newer data, and thus enable the system to adjust over time to new trends in performance.

As stated above, data may be persisted in storage. Thus, even after a restart of thread manager 220, the performance information is persisted. Persisting the data can enable thread manager 220 to restart with a "reasonable" number of threads related to the performance data, rather than initiating to some fixed or arbitrary initial value. Persisted data may also allow for recovery, for example, by restoring the last stored state as the recovery state.

Thus, as described, thread manager 220 can manage thread pool 210 based on a historical view approach. Considerations that may be kept as historical performance data may be: memory consumption, amount of memory, CPU clock speed, etc. Thread manager 220 analyzes raw data for statistical data, which can be used for managing the threads. In one implementation, attempting to utilize approximately two-thirds of a Gauss curve of resource load is a target for thread pool size. The resource consumption is adapted to past usage scenarios.

Each component described herein may be a means for performing the functions described. Each components described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 3:
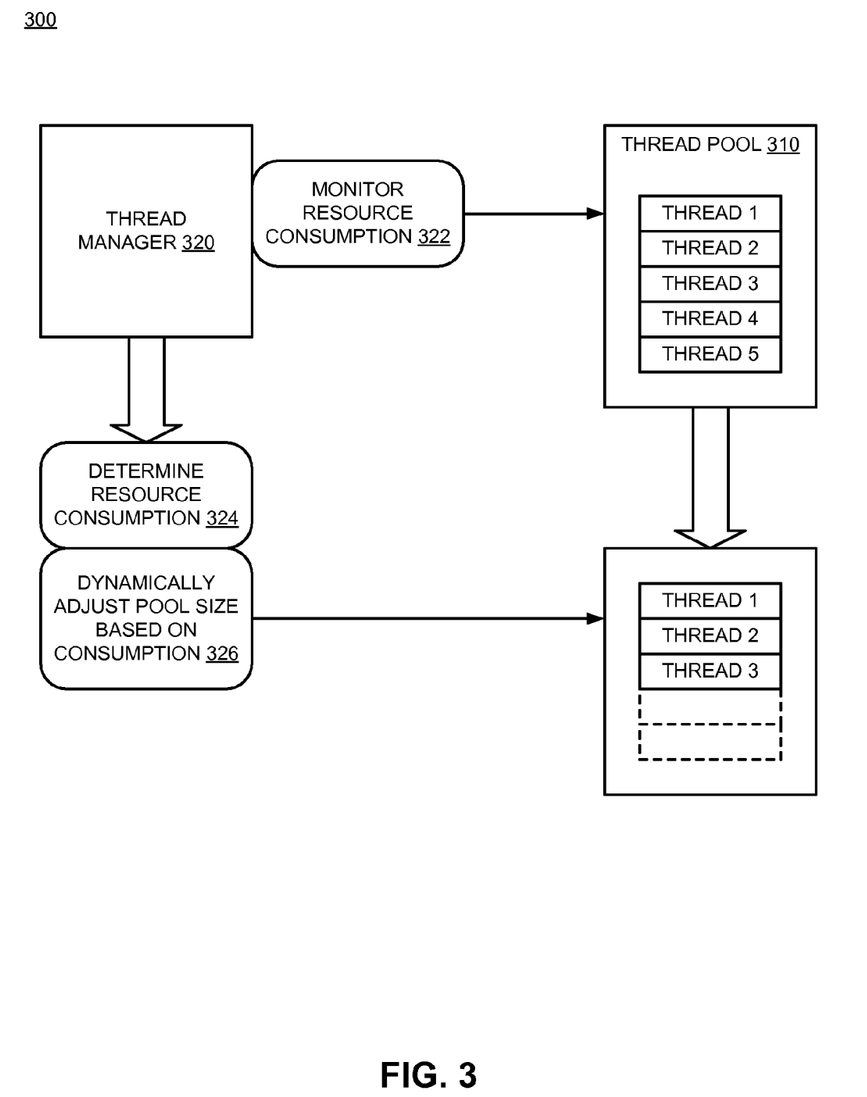
FIG. 3 is a block diagram of an embodiment of a system having a thread manager that manages a thread pool.

FIG. 3 is a block diagram of an embodiment of a system having a thread manager that manages a thread pool. System 300 illustrates thread manager 320, which is an example of an embodiment of a thread manager according to any embodiment described herein. Likewise, thread pool 310 represents a thread pool as described herein. Thread pool 310 includes threads 1 through 5 at a first look at system 300. Thread manager 320 manages thread pool 310 on historical performance data, which may be gathered and applied over the course of hours, a day, a week, a month, a year, or some other granularity. Thread manager 320 monitors resource consumption in system 300, as illustrated in 322. Based on the resource consumption of system 300, especially based on current consumption of thread pool 310, and based on historical performance data, thread manager 320 can dynamically adjust the size of thread pool 310.

Thread manager 320 determines resource consumption, 324, from the monitoring, and may factor in historical data. Based on the historical indicators of the consumption, thread manager 320 dynamically adjusts the pool size, 326. Thus, instead of having threads 1 through 5, threads 4 and 5 may be eliminated, leaving just threads 1, 2, and 3 remaining available in thread pool 310.

Note that there may be differing approaches to thread pool usage. In one embodiment, threads are accessed in a top-down approach. Thus, when a thread is requested, the system first looks to the top of the thread pool (thread 1) for a thread that can be allocated for use. The first non-busy thread in the pool is obtained to perform work. In this manner, threads at the bottom of the pool (in the above example, threads 4 and 5) will remain unused for the longest period of time, allowing them to be closed, if the system resource consumption does not justify keeping them open. As described above, threads can be considered for closing if they are unused for a threshold period of time.

Figure 4:
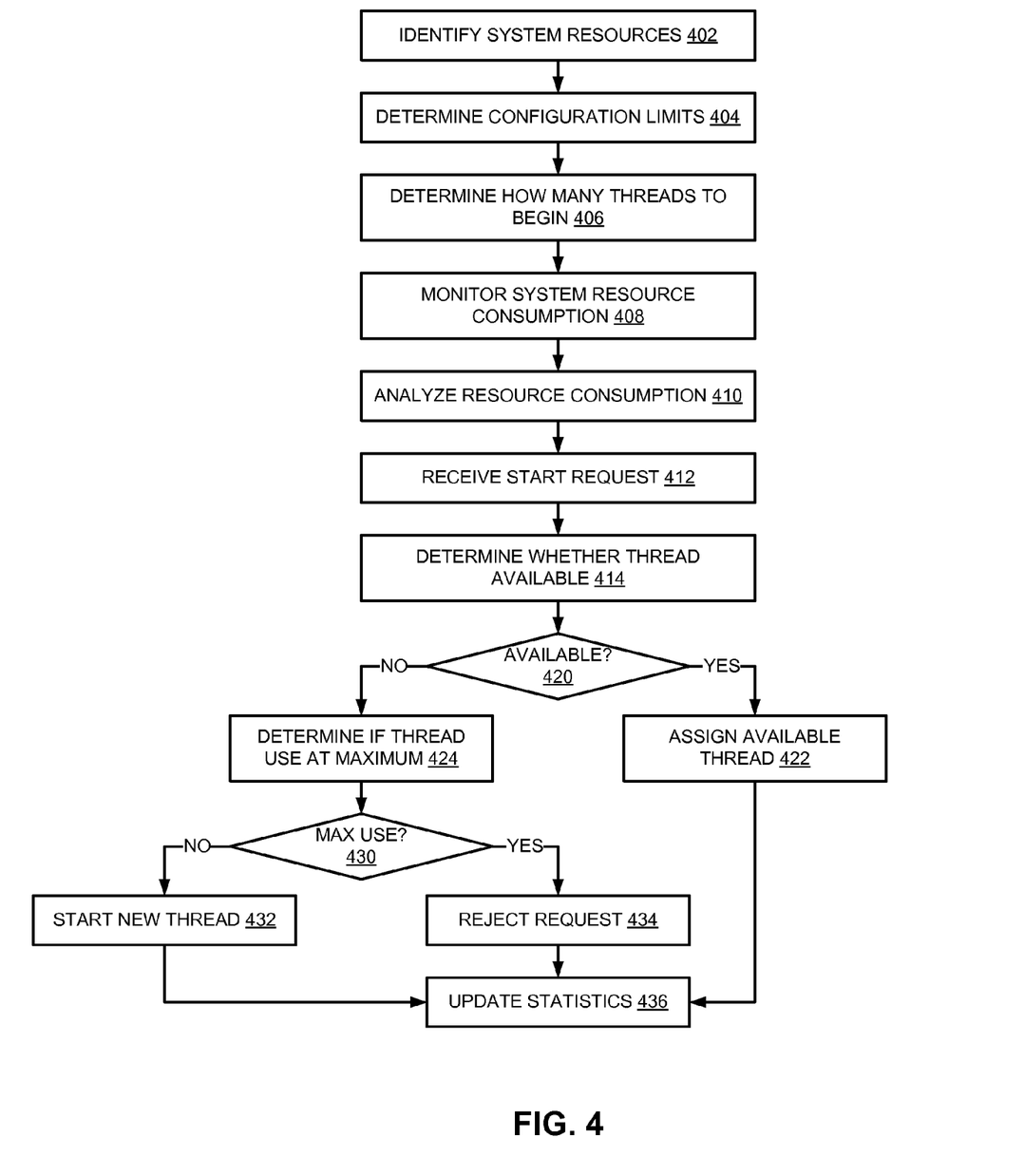
FIG. 4 is a flow diagram of an embodiment of a process for dynamically managing a thread pool.

FIG. 4 is a flow diagram of an embodiment of a process for dynamically managing a thread pool. Flow diagrams as illustrated herein provide examples of sequences of various process actions. Although shown in a particular sequence or order, unless otherwise specified, the order of the actions can be modified. Thus, the illustrated implementation should be understood only as an example, and the process can be performed in a different order, and some actions may be performed in parallel. Additionally, one or more action can be omitted in various embodiments of the invention; thus, not all actions are required in every implementation. Other process flows are possible.

In one embodiment, system resources are identified prior to configure a system. Thus, the system identifies system resources (e.g., memory, processing power, etc.), 402. Based on the system resources, the system can determine configuration limitations that can be placed on the system, 404. The configuration limitations may refer, for example, to configuration maximums, meaning that a certain thread pool size should not be exceeded. The system also determines how many threads to begin, 406. The system may be able to determine an initial thread pool size independent of the system configuration limitations, to the extent that maximums are not exceeded. Initial thread pool size can be preconfigured, or can be configured based on total system resources.

Once the thread pool is operating, the system, via a thread manager, monitors system resource consumption, 408. The system resource consumption is gathered and may be stored in memory or storage, and analyzed for resource consumption trends, 410. Analyzing the resource consumption can refer to applying statistical algorithms that determine what performance to expect in a given period of time based on current activity and past performance.

In the active system, a request for a thread may be received, 412. The system determines whether there is an available thread in the pool to service the request, 414. As mentioned above, one implementation involves the use of a top-down allocation of threads. If a thread is available, 420, the available thread is assigned, 422. If there is no currently available thread, 420, the system may determine if thread use is at a maximum, meaning thread pool size is at the highest size allowed, 424. If the maximum use of the system is not already reached, 430, a new thread is started, 432. A new thread is then added to the pool. Conversely, as discussed above, if a thread is inactive in the system for a long enough period, the thread pool can be contracted, and threads closed. If the maximum thread use of the system has been reached, 430, the request is rejected, 434. Whether a new thread is started, 432, an available thread is assigned and changed from idle to active, 422, or a request for a thread is rejected, 434, the performance statistics for the system are updated, 436. Such performance statistics inform future thread pool management.

Besides what is described herein, various modifications may be made to the disclosed embodiments and implementations of the invention without departing from their scope. Therefore, the illustrations and examples herein should be construed in an illustrative, and not a restrictive sense. Additional material attached hereto provides further details and more concepts that are part of this disclosure. The scope of the invention can be identified based on the materials herein, as well as the claims that follow.

What is claimed is:

1. A method for managing a pool of computing threads, comprising:
    monitoring thread performance in a computing system having a thread pool with a number of threads on which to execute tasks of processes in a multitasking system that executes tasks in parallel in multiple threads, each process including one or more tasks to be executed by threads of the thread pool,
    including monitoring a period of time of inactivity of individual threads of the thread pool and closing threads that are inactive for a threshold period of time, wherein the thread pool distributes work in a top-down approach, where threads are assigned a place in the thread pool from top to bottom, and tasks of the processes are assigned to a first inactive thread starting from the top of the thread pool;
    storing data representing the thread performance with historical thread performance data to generate cumulative thread performance data;
    monitoring and identifying a current resource consumption of the thread pool;
    dynamically changing the number of threads in the thread pool based on the cumulative thread performance and the identifying current resource consumption, wherein dynamically changing the number of threads in the thread pool includes adding the threads to the bottom of the thread pool to expand the thread pool, or closing the threads that are inactive for the threshold period of time; and
    wherein the threads are returned to the top of the thread pool when execution of the one or more tasks by the threads are completed.

2. The method of claim 1, wherein monitoring the thread performance comprises:
    receiving an indication from a thread when it begins execution;
    receiving an indication from the thread when it stops execution; and
    determining a time signature of the period of execution of the thread.

3. The method of claim 2, wherein determining the time signature comprises:
    determining an amount of time of execution of the thread.

4. The method of claim 2, wherein determining the time signature comprises:
    determining a time of day of the execution of the thread.

5. The method of claim 2, wherein determining the time signature comprises:
    determining a day of the week of the execution of the thread.

6. The method of claim 1, wherein monitoring the thread performance comprises:
    determining an expected period of time of inactivity for a thread, wherein the threshold period of time is based on the expected period of time of inactivity.

7. The method of claim 1, wherein storing the data representing the thread performance to generate the historical thread performance data further comprises:
    performing a statistical accumulation of the thread performance information, where newly generated thread performance information is weighted more heavily than existing historical thread performance data.

8. The method of claim 1, wherein storing the data further comprises:
    storing the historical thread performance data to nonvolatile storage to persist the historical thread performance data.

9. The method of claim 1, wherein dynamically changing the number of threads in the thread pool further comprises:
    adding or deleting threads up to a configured maximum or minimum, respectively.

10. The method of claim 9, further comprising:
    determining a hardware configuration of the computing system; and
    automatically configuring maximum and minimum settings based on the hardware configuration.

11. An article of manufacture comprising a machine readable storage medium having content stored thereon that provides instructions to cause a machine to perform operations for thread pool management, including:

collecting thread performance data for a computing system having a thread pool with a size, the size indicating a number of threads on which tasks of processes in a multitasking system can be executed, the multitasking system to execute tasks in parallel in multiple threads, each process including one or more tasks to be executed by threads of the thread pool, wherein the thread pool distributes work in a top-down approach, where threads are assigned a place in the thread pool from top to bottom, and tasks of the processes are assigned to a first inactive thread starting from the top of the thread pool, including monitoring a period of time of inactivity of individual threads of the thread pool and closing threads that are inactive for a threshold period of time;

aggregating the collected thread performance data with previously-collected thread performance data to generate cumulative thread performance data;

monitoring and identifying a current resource consumption of the thread pool;

adjusting the thread pool size based on the cumulative thread performance data and the identifying current resource consumption, wherein adjusting the thread pool size includes adding the threads to the bottom of the thread pool to expand tile thread pool, or closing the threads that are inactive for threshold period of time; and wherein the threads are returned to the top of the thread pool when execution of the one or more tasks by the threads are completed.

12. The article of manufacture of claim 11, wherein the content for collecting the thread performance data comprises content for receiving an indication from a thread that the thread has stopped execution;

retrieving time information;

associating the time information with the stop indication; and determining a length of time the thread was executing.

13. The article of manufacture of claim 11, wherein the content for aggregating the collected thread performance data further comprises content for identifying statistical information in the collected thread performance data.

14. The article of manufacture of claim 13, wherein the content for aggregating the collected thread performance data with the previously-collected thread performance data further comprises content for weighting the statistical formation and the previously-collected thread performance data; and combining the weighted statistical information with the weighted previously-collected thread performance data to generate the cumulative thread performance data.

15. A multitasking computer system to execute a thread manager comprising:

a memory device to store thread performance data for a thread pool having a number of threads on which tasks of processes in the multitasking computer system can be executed, the multitasking computer system to execute tasks in parallel in multiple threads, each process including one or more tasks to be executed by threads of the thread pool, wherein the thread pool distributes work in a top-down approach, where threads are assigned a place in the thread pool from top to bottom, and tasks of the processes are assigned to a first inactive thread starting from the top of the thread pool; and a processor to execute the thread manager, the thread manager including a thread performance collection module that gathers and stores thread performance data on the memory device for the thread pool, the thread performance data to be stored with other thread performance data to result in cumulative thread performance data;

wherein the thread performance collection a period of time of inactivity of individual threads of the thread pool and closing threads that are inactive for a threshold period of time;

a thread activity module that identifies thread performance of the threads in the thread pool, including an amount of resources consumed by the threads, and including a period of time of inactivity of individual threads of the thread pool;

a thread manager monitor and identify a current resource consumption of the thread pool;

a thread pool adjuster that changes the number of threads in the thread pool based on the current resource consumption and a prediction of thread performance, the prediction based on the cumulative thread performance data, including adding a thread to the bottom of the thread pool to expand the thread pool, or closing threads that are inactive for the threshold period of time, the threshold period of time indicated by the cumulative thread performance data; and wherein the threads are returned to the top of the thread pool when execution of the one or more tasks by the threads are completed.

16. The computer system of claim 15, further comprising:

a resource identifier that identifies hardware resources of a computing system in which the thread pool operates, the resource identifier to further dynamically configure maximum and initial thread pool settings based on the hardware resources identified.

17. The computer system of claim 15, further comprising:

a statistics engine that performs statistical analysis of the collected thread performance data.

18. The computer system of claim 17, wherein the statistics engine further comprises:

an aggregation module that aggregates statistical data of the collected thread performance data with statistical data of previously-collected thread performance data, to result in the cumulative performance data.

* * * * *